Nov. 18, 1941.  C. D. CLAWSON ET AL  2,262,833
VEHICLE LIFT
Filed July 20, 1940  3 Sheets-Sheet 1
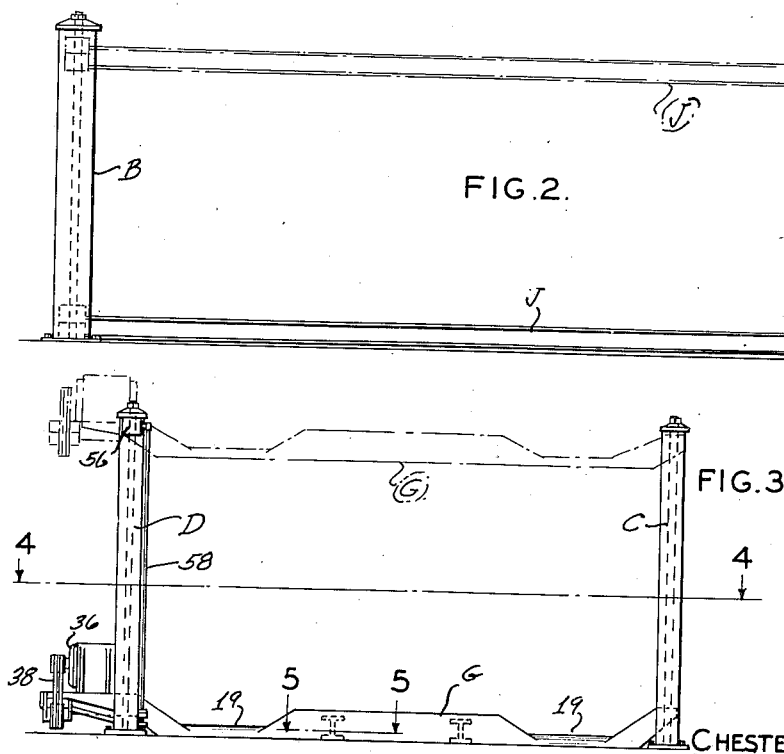
INVENTORS
CHESTER D. CLAWSON
THOMAS H. BRANCH
BY
ATTORNEY.

Nov. 18, 1941.   C. D. CLAWSON ET AL   2,262,833
VEHICLE LIFT
Filed July 20, 1940   3 Sheets-Sheet 2
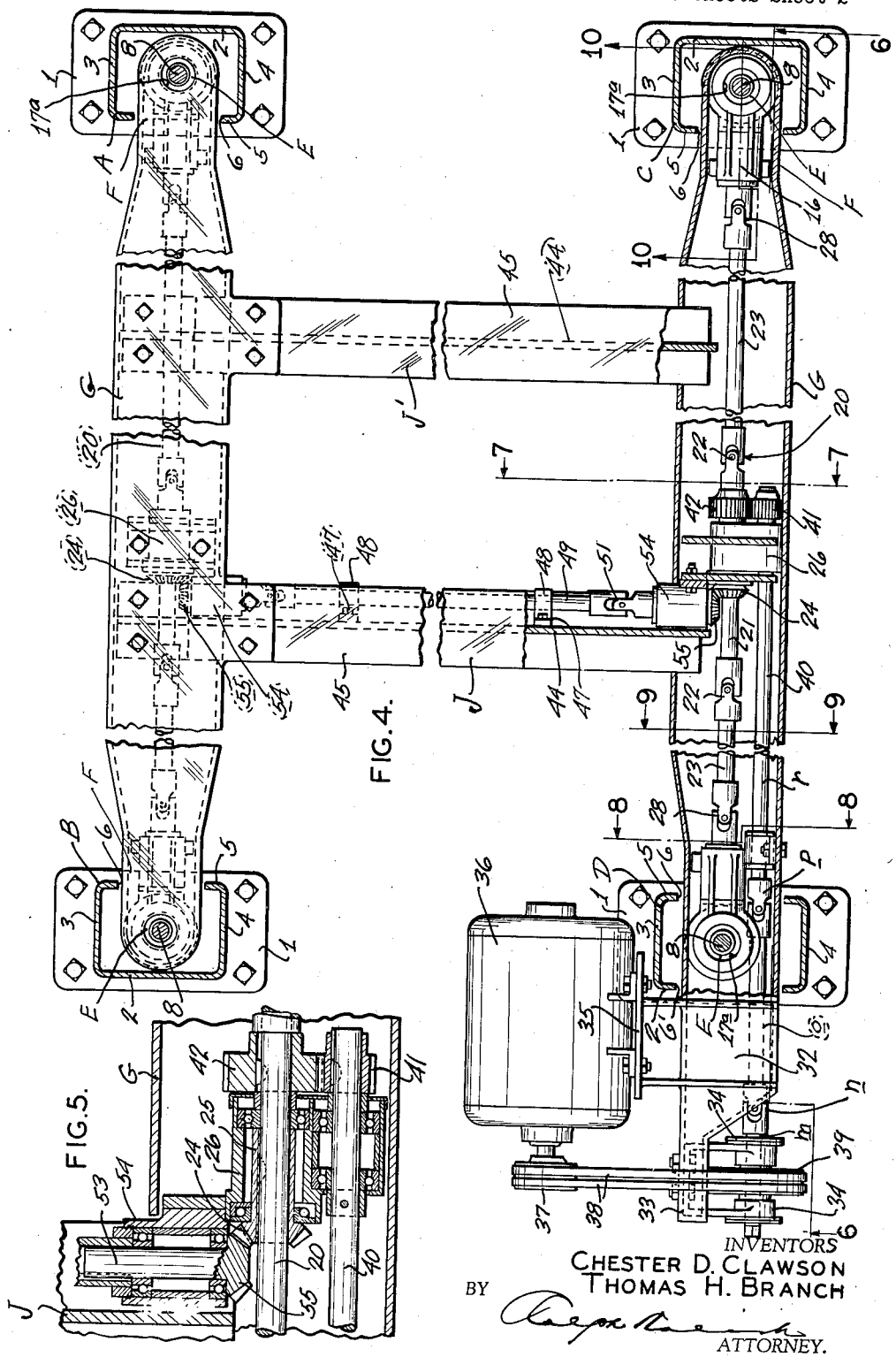
INVENTORS
CHESTER D. CLAWSON
THOMAS H. BRANCH
BY
ATTORNEY.

Nov. 18, 1941.    C. D. CLAWSON ET AL    2,262,833
VEHICLE LIFT
Filed July 20, 1940    3 Sheets-Sheet 3
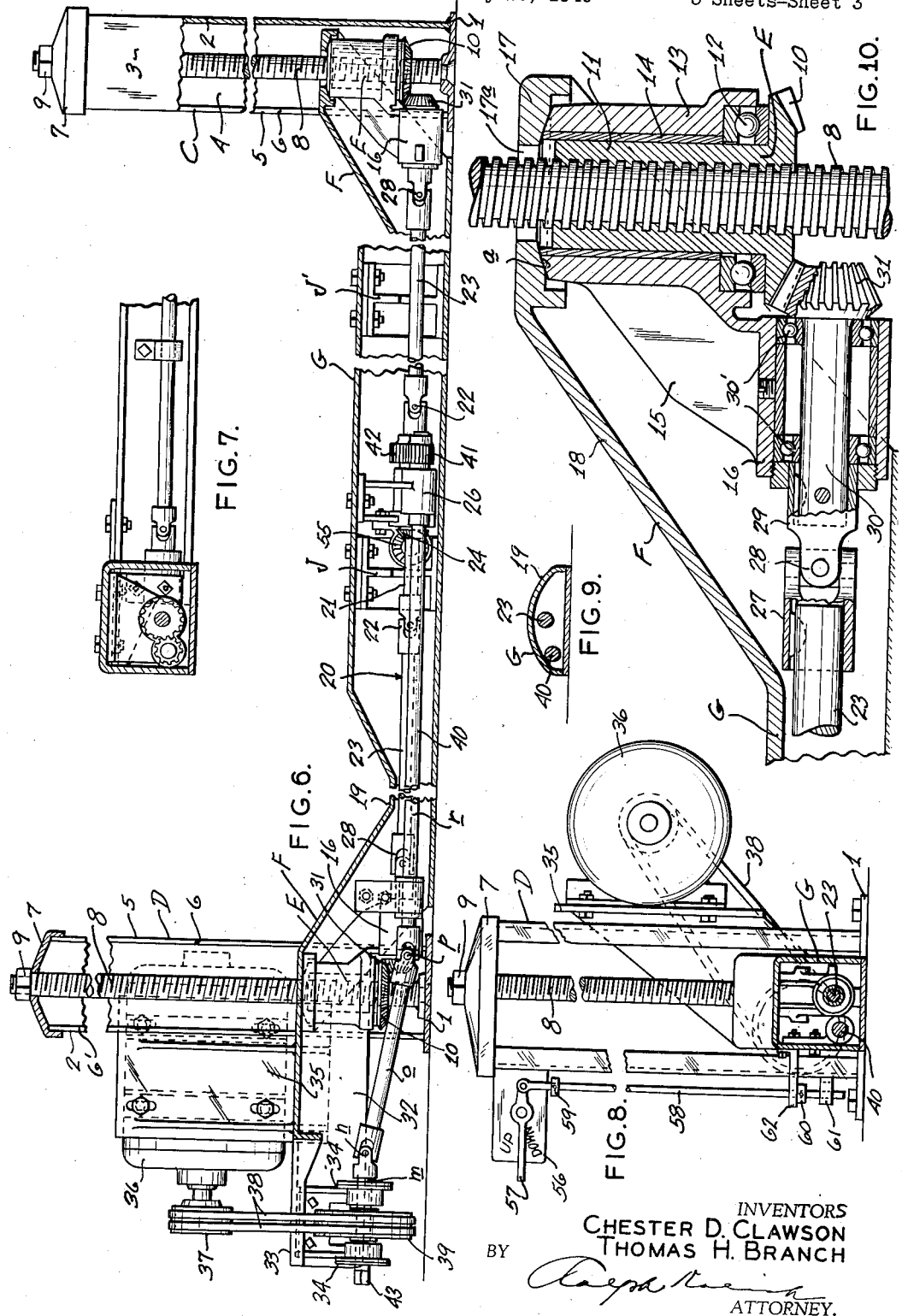
INVENTORS
CHESTER D. CLAWSON
THOMAS H. BRANCH
BY
ATTORNEY.

Patented Nov. 18, 1941

2,262,833

UNITED STATES PATENT OFFICE 2,262,833

VEHICLE LIFT

Chester D. Clawson, Pine Lawn, and Thomas H. Branch, St. Louis, Mo., assignors to St. Louis Lift & Equipment Corporation, St. Louis, Mo., a corporation of Missouri Application July 20, 1940, Serial No. 346,460

7 Claims. (Cl. 254—92)

This invention relates generally to vehicle lifts and, more particularly, to certain new and useful improvements in lifts especially, though not exclusively, adapted for use in connection with motor vehicles, such as passenger automobiles, trucks, buses, and the like, for elevating the vehicles for facilitating lubrication, repair operations, and analogous purposes.

Our invention has for its primary objects the provision of a lift of the type and for the purposes stated which may be readily installed with the elimination of excavations or other costly preparatory operations, which is stable, positive, and safe in operation, in which travel of the vehicle supporting frame may be stopped and the frame effectively held at any level of elevation, in which travel of the vehicle supporting frame is automatically controlled at the upper and lower limits of its movement, which is economical in maintenance and operating costs, and which is comparatively free of occupational hazards in that moving parts are largely concealed, protected, and guarded.

Our invention has for further objects the provision of a lift which is conveniently adaptable for operatively meeting unevenness in the floor or other supporting structure, in which the vehicle supporting frame may freely travel notwithstanding one or the other of the posts of the structure may rock or be out of a true vertical position, which is extremely flexible in operation, and which is highly efficient in the performance of its stated functions.

And with the above and other objects in view, our invention resides in the novel features of form, construction, arrangement, and combination of parts presently described and pointed out in the claims.

In the accompanying drawings (3 sheets)—

Figure 1 is a plan view of a vehicle lift constructed in accordance with and embodying our present invention;

Figure 2 is a side elevational view of the lift;

Figure 3 is an end elevational view of the lift;

Figures 4 and 5 are enlarged detail sectional views of the lift taken approximately along the lines 4—4 and 5—5, respectively, Figure 3;

Figures 6, 7, 8, and 9 are enlarged detail sectional views of the lift taken approximately along the lines 6—6, 7—7, 8—8, and 9—9, respectively, Figure 4; and Figure 10 is an enlarged fragmentary sectional view of the lift taken approximately along the line 10—10, Figure 4, illustrating in more detail one of the self-compensating or equalizing hanger-bearings of the lift.

Referring now in more detail and by reference characters to the drawings, which illustrate a preferred embodiment of our present invention, the lift includes four upstanding parallel corner posts A, B, C, and D juxtaposed in the formation of a skeleton or open oblong-rectangular standard, the posts A, B, and C being each preferably constructed in the form of a hollow rectangular column having a preferably integrally formed flanged base 1 for floor attachment, an outer or front wall 2, opposite side walls 3 and 4, an inwardly presented so-called rear wall 5 provided lengthwise with a slot or way 6, and a centrally apertured top wall or cap 7. The remaining post D, which likewise includes a base 1, a front wall 2, side walls 3, 4, a rear wall 5, and a cap 7, is, however, provided in both its rear wall 5 and front wall 2 with registering longitudinal slots 6, 6', for purposes presently appearing.

Welded or otherwise suitably fixed at its lower end in the base 1 and disposed axially or longitudinally within each respective post A, B, C, D, is a threaded shaft or stationary screw 8 projecting at its upper end through the aperture of, and securely, as by means of a cap-nut or the like 9, held under tension in, the cap 7.

Threadedly mounted for movement or travel on each of the screws 8, is a screw-nut E having a bevel gear end-portion or ring 10 and a suitably elongated and diametrically reduced shank or bearing-portion 11, and loosely journaled or sleeved upon the shank 11 and supported upon the upper flat face of the bevel gear ring 10 by means of a conventional ball-bearing ring 12, is a hub 13 provided with an internal anti-friction brass sleeve 14 and joined preferably integrally by a suitable arm 15 with a horizontally disposed journal sleeve 16.

Upon its upwardly presented face, the hub 13 is machined or otherwise ground off, as at a, to a somewhat spherical contour for rockable co-operation with a complementary inverted cup-like shoe 17 having an enlarged opening 17ª freely and loosely embracing the particular screw 8, as best seen in Figure 10, and preferably integral with a supplemental or extension arm 18 presented outwardly through the adjacent shaft-way or slot 6 and joined to, or otherwise forming part of, a bracket F forming, in turn, part of a hollow or tubular cross-beam G of a so-called vehicle supporting and lifting frame. It will be understood that the arm 18 is of reduced width or thickness for facile travel in the slot 6 relatively to the particular post.

Each of the two cross-beams G of the lift is of a length to extend between the columns or posts at an end of the lift, as, for instance, between the posts A and B at one lift-end and between the posts C and D at the opposite lift-end, each cross-beam G being reduced in thickness and pressed to an upwardly convex contour at spaced portions in the provision of so-called roll-over sections 19 aligning at the opposite ends of the lift for accommodating the vehicle wheels.

Extending axially or longitudinally through the respective cross-beams G, is a sectional shaft 20 including a central portion 21 connected at its opposite ends by means of conventional universal joints 22 to end portions 23. Intermediate its ends, the central shaft portion 21 extends through, and is pinned in, a bevel gear ring 24, the hub 25 of which is journaled in a bearing bracket 26 suitably fixed within the particular cross-beam G, as best seen in Figures 4 and 5.

At its opposite or outer end, each shaft section 23 is slidably keyed in a coupling member 27 of a universal joint 28, the other coupling member 29 of which is, in turn, pinned upon the end of a stub shaft 30 journaled by means of ball-rings 30' in the sleeve 16 and suitably provided at its outer end with a bevel gear 31 for meshing engagement with the gear ring 10 of the screw nut E, all as best seen in Figure 10 and for purposes presently appearing.

A particular bracket F adjacent to, and associated with, the lift-post D includes an arm-elongation or extension 32, which projects outwardly through the post slot 6' and is provided with a flattened end-flange 33 for dependingly supporting spaced parallel journal-brackets 34.

Intermediate the front wall 2 of post D and the end-flange 33, the arm 32 is provided with a laterally extending horizontal bracket or shelf 35 for supporting an electric motor 36, the drive pulley 37 of which is conventionally connected by means of belts 38 with pulleys 39 keyed upon a shaft section $m$ journaled in the brackets 34 and forming part of a main drive shaft 40 disposed for rotation in the cross-beam G.

As best seen in Figures 4 and 6, the shaft-section $m$ has a substantially universal connection, as at $n$, with a second shaft-section $o$, in turn, joined, as at $p$, with a third shaft-section $r$ journaled at its inner end in the bearing sleeve or bracket 26 and provided with a drive-pinion 41 having meshing engagement with a companion pinion 42 keyed upon the adjacent shaft 20. On its projecting outer end, the drive shaft section $m$ is provided with a squared end-portion, as at 43, for purposes presently fully appearing.

Bolted or otherwise fixed at their opposite ends upon, and extending longitudinally of the lift between, the cross-beams G and also forming part of the vehicle lifting frame, is a pair of laterally spaced parallel beams J, J', each preferably constructed of rolled steel I-beams having a vertically disposed web 44 and a horizontally disposed top flange 45 for supportingly engaging the under side of the vehicle axles, as presently more fully described.

Fixed, as by bolts or other conventional securing means 46 upon the web 44 of one of said lift-beams, as, for instance, beam J, is a pair of laterally presented brackets 47 having axially aligned bearing-sleeves 48 for rotatably accommodating a cross-shaft 49 preferably connected by universal joints 51 with stub-shafts 53 journaled in bearings 54 on the cross-beams G and provided with bevel gears 55 having meshing engagement with the respective bevel gear-rings 24, all as best seen in Figures 5 and 6 and for purposes presently fully appearing.

Mounted upon, and projecting laterally from, the side wall 3, and adjacent the upper end, of the post D, is a motor control switch 56 preferably of the conventional double-pole double-throw type, suitably connected in circuit with the motor or other prime-mover 36. The switch 56 includes an external actuating arm 57 pivotally connected at one end to the upper extremity of a vertically disposed rod 58 provided intermediate its ends with spaced set collars 59, 60. At its lower end, the rod 58 is shiftably extended through an ear 61 fixed upon the outer face of the post-wall 3. Fixed upon the adjacent cross-beam G, is an arm 62 having its outer end embracingly disposed for slidable movement around the rod 58 intermediate the collars 59, 60, all as best seen in Figure 8 and for purposes presently fully appearing.

In use and operation, the vehicle to be elevated is driven over the roll-over beam-sections 19 to a position intermediate the cross-beams G in more or less central disposition over the lift-beams J, J'. Thereupon, the switch arm 57 is shifted to "up" position, closing the circuit to the motor 36. Upon energization, the rotary movement of its pulley 37 is transmitted through the belts 38 and pulleys 39 to the main driveshaft 40, then through the meshing gears or pinions 41, 42, to the one jointed shaft 20 of one beam G, and then through the pairs of meshing gears 24, 55, and the shaft 49 to the shaft 20 of the companion beam G. The rotary movement of the shafts 20 is, in turn, transmitted through the bevel gears 31 to the gear-rings 10, and the screw-nuts E threaded upwardly along the stationary screw shafts 8, elevating the cross-beams G and the associated lift-beams J, J'. As the top flanges 45 of the beams J, J', come into abutting engagement with the under sides of the axles of the particular vehicle, the vehicle is thereupon moved upwardly with the lift-beams J, J', to any desired elevation, whereupon the switch arm 57 may be shifted to "off" position for breaking the circuit to the motor 36 and discontinuing further upward travel of the lift.

By reason of the fact that the stationary screws 8 are of so-called slow pitch, the cross-beams G and associated lift-beams J, J', will remain in elevated position regardless of load and will not accidentally drop. If, through carelessness of the operator or some other accidental cause, the switch arm 57 is not shifted to "off" position and the cross-beams G approach the upper limits of the stationary screws 8, the arm 62 will come into engagement with the set collar 59, thereby automatically shifting the rod 58 upwardly and throwing the switch arm 57 to "off" position and effecting cessation of upward travel of the lift before the gear-nuts E reach the extreme upper end of the stationary screw shafts 8.

To lower the lift and the supported vehicle, the switch-handle 57 is shifted to "down" position, whereupon the motor 36 will be turned in the opposite direction and the entire mechanism be reversed for lowering the lift-beams J, J', and the supported vehicle to the ground. When the lift-beams J, J', have been fully lowered, the switch-handle 57 will come in contact with the collar 60, and the rod 58 will be automatically shifted to "off" position for interrupting the circuit to the motor 36. In the event of power failure or other such cause, the lift may be manually lowered by rotary manipulation of a conventional crank (not shown) operatively disposed upon the squared end 43 of the shaft 40.

It will be evident by reference to Figure 10 that the arcuate bearings between the respective members E and beams G provided by the ground hubs 13 and shoes 17, the loose embracing engagement between the several shoes with the screws 8, and the axial shiftability of the shaft-sections 30 permitted by the slidable coupling-members 27—28, freely permit and efficiently compensate for any so-called out-of-alignment or true verticality of the several screws 8, and thus the lift may freely travel upwardly and downwardly relatively to the standard provided by the posts A, B, C, and D, notwithstanding the fact that one or more of said posts and their housed screw-shafts 8 may be out of true vertical registration or alignment.

Thus, by our present invention, we provide a unique vehicle lift which fulfills in every respect the objects stated, and it should also be understood that changes and modifications in the form, construction, arrangement, and combination of the several parts of the lift may be made and substituted for those herein shown and described without departing from the nature and principle of our invention.

Having thus described our invention, what we claim and desire to secure by Letters Patent is:

1. In combination, a standard including a plurality of spaced upstanding shafts, a vehicle lift frame disposed within the standard, frame-supporting means including members movable on the shafts and brackets journaled on said members, support-means on the frame resting for relative movement in all directions on said brackets, and driving means mounted on the frame and co-operable with the shaft-members for raising or lowering the frame relatively to the standard.

2. In combination, a standard including a plurality of spaced upstanding stationary threaded shafts, screw nuts mounted for travel on the shafts, bearing means rotatably mounted on each screw nut, a vehicle lift frame disposed within the standard, arms on said frame loosely embracing said shafts and loosely resting for relative movement in all directions upon said bearing means, and mechanism for effecting lift raising or lowering rotation of the nuts on the shafts.

3. In combination, a standard including a plurality of spaced upstanding stationary screw shafts, a vehicle lift frame disposed within the standard, screw nuts mounted for travel on the shafts, bearing means rotatably mounted on each screw nut, arms on said frame loosely embracing the shafts and resting on said bearing means, said bearing means and said arms being provided with respectively convex and concave interfitting surfaces for permitting relative rocking movement, and means for effecting lift elevating or lowering rotation of the nuts on the shafts.

4. In combination, a standard including a plurality of spaced upstanding stationary screw shafts, a vehicle lift frame disposed within the standard, screw nuts mounted for travel on the shafts, bearing means rotatably mounted on each screw nut, arms on said frame loosely embracing the shafts and resting on said bearing means, said bearing means and said arms having engaging portions respectively of convex and concave contour for permitting relative rocking movement, and means including relatively shiftable members for effecting frame elevating or lowering rotation of the nuts on the shafts irrespective of the true verticality of the latter.

5. In combination, a standard including a plurality of spaced upstanding stationary screw shafts, screw nuts mounted for travel on the shafts, a bearing collar rotatably embracing each nut and having an arcuate end-face, a vehicle lift frame disposed within the standard, arms on said frame having end-portions apertured for loosely embracing the shafts and having arcuate under faces resting on the arcuate faces of said collars for permitting relative rocking movement, and means including a plurality of interconnected shafts having shiftable connection with said nuts for effecting frame elevating or lowering rotation thereof.

6. A vehicle lift including a standard comprising a plurality of spaced upstanding hollow posts each having a longitudinally slotted vertical wall, stationary screw shafts mounted co-axially within each respective post, screw nuts threadedly mounted on the shafts, and having collars each provided with an upwardly presented spherical surface, a vehicle supporting frame disposed for movement within the standard, bracket-arms on the frame projecting through said slots and resting upon said spherical surfaces, a plurality of interconnected shafts mounted for rotation upon the frame and having shiftable driving connection with said screw nuts, and means comprising an electric motor mounted on the frame and drivingly connected to the shafts for simultaneously rotating the screw nuts.

7. An automotive lift comprising a plurality of upstanding post-members each provided with a fixed vertical screw, a gear nut threadedly mounted upon each of said screws, bracket means mounted on each of the gear nuts for vertical movement therewith and having a bearing disposed at a fixed angle with respect to the axis of rotation of the gear nut, gear-nut driving means rotatively mounted in the bearing for meshing engagement with the gear nut, a frame disposed within the space defined by the posts for vertical movement therein and having means for rockably engaging the brackets to compensate for vertical deflection of the screws, and driving means mounted on the frame for movement therewith and having drive shaft means slidably keyed to the gear-nut driving means for maintaining driving connection to the gear nuts irrespective of the compensatory shifting movement of the frame with respect to the brackets.

CHESTER D. CLAWSON.
THOMAS H. BRANCH.